US009419746B1

(12) United States Patent
Baeckler et al.

(10) Patent No.: US 9,419,746 B1
(45) Date of Patent: Aug. 16, 2016

(54) APPARATUS AND METHODS FOR TUNING A COMMUNICATION LINK FOR POWER CONSERVATION

(71) Applicant: ALTERA CORPORATION, San Jose, CA (US)

(72) Inventors: Gregg William Baeckler, San Jose, CA (US); David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/280,351

(22) Filed: May 16, 2014

(51) Int. Cl.
*H04L 1/00* (2006.01)

(52) U.S. Cl.
CPC ...................... *H04L 1/0001* (2013.01)

(58) Field of Classification Search
CPC .......... H03K 5/159; H04B 1/40; H04B 1/707; H04B 17/00; H04L 1/009; H04L 7/033; H04L 25/03; H04L 25/08; H04L 27/01; H04L 27/06; H04L 1/0001
USPC .......... 370/342; 375/229–234, 284–285, 295, 375/296, 316, 345, 348; 455/77, 226.1
See application file for complete search history.

(56) References Cited

U.S. PATENT DOCUMENTS

| | | | |
|---|---|---|---|
| 5,920,821 A | 7/1999 | Seazholtz et al. | |
| 6,014,571 A | 1/2000 | Enoki | |
| 6,128,489 A | 10/2000 | Seazholtz et al. | |
| 6,246,875 B1 | 6/2001 | Seazholtz et al. | |
| 7,415,088 B2 | 8/2008 | Peluso et al. | |
| 7,492,816 B1* | 2/2009 | Wong | H04L 1/205 333/28 R |
| 7,505,512 B1* | 3/2009 | Anderson et al. | 375/229 |
| 7,787,829 B1* | 8/2010 | Wright | 455/77 |
| 7,876,083 B2 | 1/2011 | Perrault et al. | |
| 8,611,403 B1* | 12/2013 | Ding | 375/219 |
| 8,917,803 B1* | 12/2014 | Asuncion et al. | 375/354 |
| 2003/0124999 A1* | 7/2003 | Parssinen et al. | 455/226.1 |
| 2005/0169585 A1* | 8/2005 | Aronson et al. | 385/89 |
| 2006/0188043 A1* | 8/2006 | Zerbe et al. | 375/346 |
| 2007/0064839 A1* | 3/2007 | Luu | 375/340 |
| 2007/0153887 A1* | 7/2007 | Tate et al. | 375/224 |
| 2007/0223571 A1* | 9/2007 | Viss | 375/233 |
| 2009/0110043 A1* | 4/2009 | Mellitz et al. | 375/231 |
| 2010/0046600 A1* | 2/2010 | Zerbe et al. | 375/233 |
| 2012/0257652 A1* | 10/2012 | Malipatil et al. | 375/219 |
| 2014/0226707 A1* | 8/2014 | Kaviani et al. | 375/233 |

* cited by examiner

*Primary Examiner* — Sam K Ahn
*Assistant Examiner* — Shawkat M Ali
(74) *Attorney, Agent, or Firm* — Okamoto & Benedicto LLP (57) ABSTRACT

The present disclosure provides apparatus and methods for dynamic analog tuning for power reduction. As disclosed herein, the analog controls on a high-speed serial communication channel are dynamically adjusted in a manner so as to either reduce the total system power or move power dissipation between the transmitter and receiver devices, with little or no negative effect to the bit error rate. One embodiment relates to a method for tuning a communication link. The method includes occasionally determining whether the bit error rate for the communication link is acceptably low. Control parameters for analog circuitry of the communication link are adjusted to decrease power used if the bit error rate is acceptably low and are adjusted to increase power used if the bit error rate is not acceptably low. Other embodiments, aspects and features are also disclosed.

19 Claims, 8 Drawing Sheets

APPARATUS AND METHODS FOR TUNING A COMMUNICATION LINK FOR POWER CONSERVATION

BACKGROUND

1. Technical Field

The present invention relates generally to communication links including, but not limited to, serial interfaces for integrated circuits.

2. Description of the Background Art

High-speed communication links using serial interface protocols are used to communicate data between devices in a system. Examples of industry-standard protocols for high-speed input/output (HSIO) links include those related to PCI Express® (Peripheral Component Interconnect Express), XAUI (X Attachment Unit Interface), sRIO (serial Rapid IO), and many others.

The data rate requirements of such serial data links continue to increase as technology advances. In addition, larger numbers of transceivers may be needed in certain applications due to increases in bandwidth and throughput requirements. As the data rate and the number of transceivers increase, the power consumption of the transceivers becomes of greater concern.

SUMMARY

The present disclosure provides apparatus and methods for dynamic analog tuning for power conservation. As disclosed herein, the analog controls on a high-speed serial communication channel are dynamically adjusted in a manner so as to either reduce the total system power or move power dissipation between the transmitter and receiver devices, with little or no negative effect to the bit error rate.

One embodiment relates to a method for tuning a communication link. The method includes occasionally determining whether the bit error rate for the communication link is acceptably low. Control parameters for analog circuitry of the communication link are adjusted to decrease power used if the bit error rate is acceptably low and are adjusted to increase power used if the bit error rate is not acceptably low.

Another embodiment relates to a receiver circuit that receives a serial data signal over a communication link between a transmitter circuit and the receiver circuit. A receiver buffer receives the serial data signal, and receiver equalization circuitry equalizes the serial data signal. In addition, a circuit processes the serial data signal to generate bit error data. A receiver tuning controller dynamically tunes the communication link by determining a bit error rate from the bit error data, determining whether the bit error rate is acceptably low, adjusting control parameters for analog circuitry of the communication link to decrease power used if the bit error rate is acceptably low, and adjusting the control parameters for the analog circuitry of the communication link to increase power used if the bit error rate is not acceptably low.

Another embodiment relates to a system, including a transmitter and a receiver, for conserving power used to communicate a serial data signal. The transmitter includes a driver to drive the serial data signal onto a communication channel, a transmitter equalizer to apply pre-emphasis to the serial data signal, and a transmitter tuning controller which adjusts a differential output voltage of the driver and the pre-emphasis applied by the transmitter equalizer. The receiver includes a receiver buffer which receives the serial data signal from the communication channel, receiver equalization circuitry which equalizes the serial data signal, a circuit which processes the serial data signal to generate bit error data, and a receiver tuning controller which adjusts equalizations applied by the receiver equalization circuitry based on the bit error data and which communicates adjustments to be made to the transmitter tuning controller.

Other embodiments, aspects, and features are also disclosed.

DETAILED DESCRIPTION

The present disclosure provides apparatus and methods for dynamic analog tuning for power reduction. As disclosed herein, the analog controls on a high-speed serial communication channel are dynamically adjusted in a manner so as to either reduce the total system power or move power dissipation between the transmitter and receiver devices, with little or no negative effect to the bit error rate.

Figure 1:
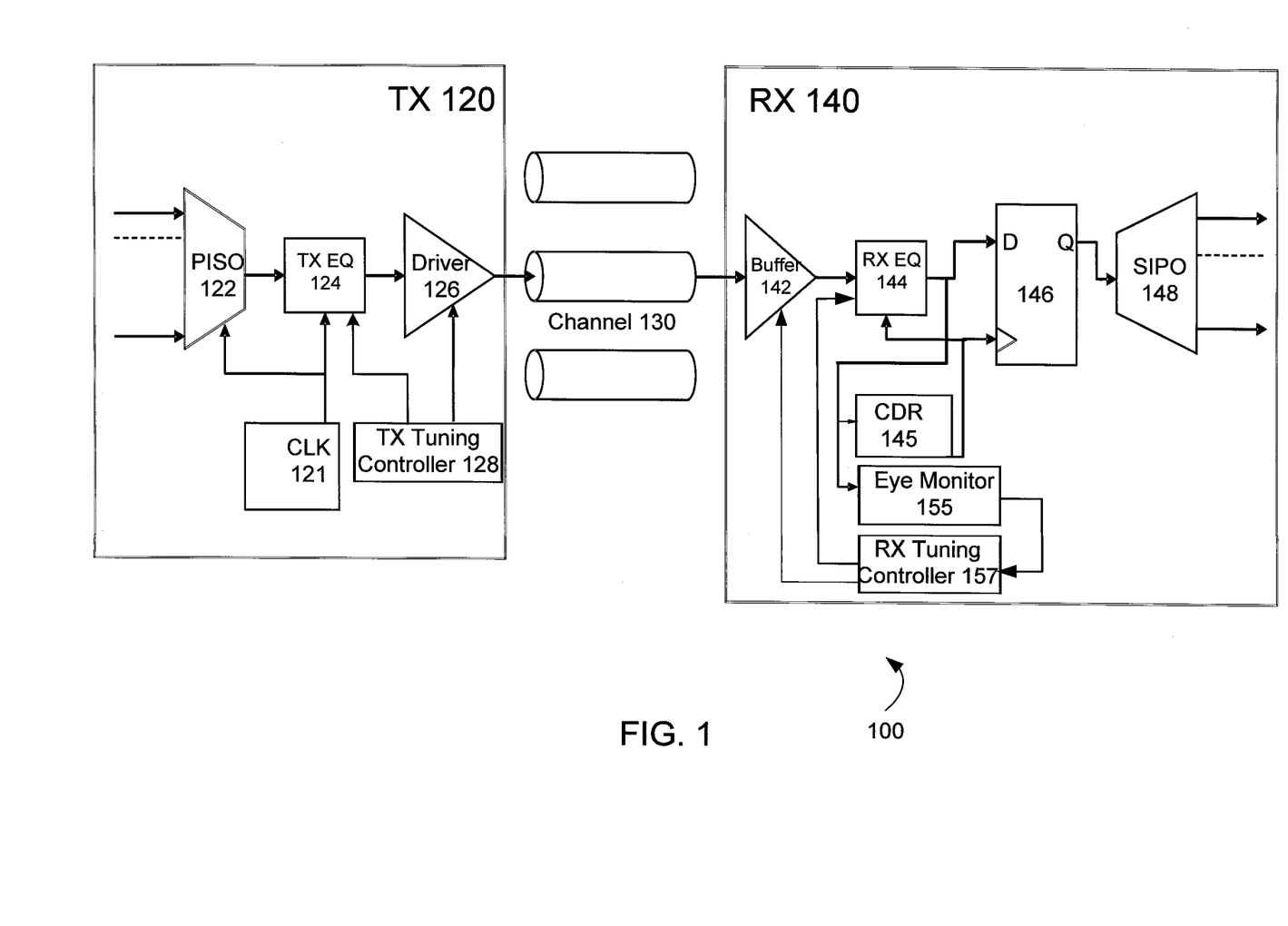
FIG. 1 is a high-level diagram of an exemplary communication link in accordance with an embodiment of the invention.

FIG. 1 is a high-level diagram of an exemplary communication link in accordance with an embodiment of the invention. As shown in FIG. 1, a communication link is generally composed of a transmitter (TX) 120, a receiver (RX) 140, and a communication channel (CH) 130 that is located in between the transmitter and the receiver.

The TX 120 may include a parallel-in-serial-out (PISO) circuit 122. The PISO (serializer) circuit 122 is configured to receive parallel data signals and convert it to a serial data signal. For example, the transmitter 120 may be part of an integrated circuit, and the parallel data signals may be provided by a communication protocol module in the integrated circuit.

The serial data signal may be adjusted by a transmitter equalizer (TX EQ) circuit 124. In one embodiment, the TX EQ circuit 124 may implement a finite impulse response (FIR) equalization that pre-distorts (pre-emphasizes) the transmitted signal to compensate for signal distortion in the channel 130. Clock generator (CLK) circuit 121 may utilize a phase locked loop circuit to provide a clock signal to the PISO 122 and TX EQ 124 circuits. The output from the TX EQ 124 circuit may be provided to a driver circuit 126. The driver circuit 126 may have a controllable output voltage and may transmit the serial data signal over the channel 130.

The TX tuning controller 128 at the TX 120 may be hard-wired and/or programmed circuitry that communicates with RX tuning controller 157 at the RX 140. In addition, the TX tuning controller 128 may control the differential output voltage (VOD) of the driver circuit 126 and may also control the pre-emphasis applied by the TX EQ 124.

In an exemplary implementation, the TX tuning controller 128 may transmit an expected power profile to the RX tuning controller 157. The expected power profile may indicate to the RX tuning controller 157 the expected power usage for different levels of VOD of the driver circuit 126. In addition, the TX tuning controller 128 may receive messages or commands from the RX tuning controller 157 to reduce or increase the VOD of the driver circuit 126.

The channel 130 communicates the serial data signal from the transmitter 120 to the receiver 140. The channel 130 may be a single lane channel for communicating the serial data signal. Alternatively, the channel 130 may use multiple lanes to communicate the serial data signal.

The RX 140 may be configured to receive the transmitted serial data signal from the channel 130 into buffer circuitry 142. The buffer circuitry 142 may have a controllable gain and may output the received serial data signal to receiver equalization (RX EQ) circuit 144.

The RX EQ circuit 144 may be configured to perform one or more equalizations. The one or more equalizations may include continuous-time linear equalization (CTLE) and decision feedback equalization (DFE).

The equalizations may typically compensate for high-frequency signal loss in the channel. The RX EQ circuit 144 may output an "equalized" serial data signal to both a clock data recovery (CDR) circuit 145 and to a data input of a latch circuit 146.

The CDR circuit 145 may use a PLL to recover the clock signal from the serial data signal. The recovered clock signal may be provided to clock inputs of the RX EQ circuit 144 and to a latch circuit 146. In accordance with an embodiment of the invention, the recovered clock signal may also be provided to an eye monitor 155. The eye monitor 155 may be an on-chip signal quality monitoring circuit module.

In one embodiment, the eye monitor 155 may be arranged to provide multiple phase blocks (for example, 32 phase blocks) spanning a complete unit interval. The eye monitor 155 may block through the multiple phase blocks and monitor a bit error rate (BER) at each phase block so as to determine a horizontal size of the eye opening. Different voltage thresholds may be used in determining the BER so as to also determine a vertical size of the eye opening. One exemplary implementation of the eye monitor 155 may be an EyeQ viewer circuit module available on certain field programmable gate array (FPGA) products from Altera Corporation of San Jose, Calif.

The RX tuning controller 157 at the RX 120 may be hard-wired and/or electronically-programmed circuitry that communicates with TX tuning controller 128 at the TX 120. In addition, the RX tuning controller 157 may receive bit error rate (BER) and other eye opening data from the eye monitor 155. Furthermore, the RX tuning controller 157 may control the gain of the receiver buffer 142 and the level of equalization performed by the RX EQ 144.

In an exemplary implementation, the RX tuning controller 157 may periodically determine from the BER data whether the BER of the data link is acceptable or not. If the BER is not acceptable, then the RX tuning controller 157 may adjust the TX 120 and/or the RX 140 to increase power used. Such a power increase may raise the VOD of the driver 126 and/or raise the level of equalization performed by the RX EQ 144.

On the other hand, if the BER is acceptable, then the RX tuning controller 157 may adjust the TX 120 and/or the RX 140 to reduce power used. Such a power reduction may lower the VOD of the driver 126 and/or reduce the level of equalization performed by the RX EQ 144.

The latch circuit 146 may be configured to receive the "equalized" serial data signal from the RX EQ circuit 144 at its data input and to receive the recovered clock signal from the CDR circuit 145 at its clock input. The latch circuit 146 outputs the regenerated serial data signal to a serial-in-parallel-out (SIPO) circuit 148. The SIPO (serializer) circuit 148 is configured to receive a serial data signal and convert it to parallel data signals. The parallel data signals may be provided to other circuitry of the receiving device. For example, the receiving device may be an integrated circuit, and the parallel data signals may be provided to a communication protocol module in the integrated circuit.

Figure 2:
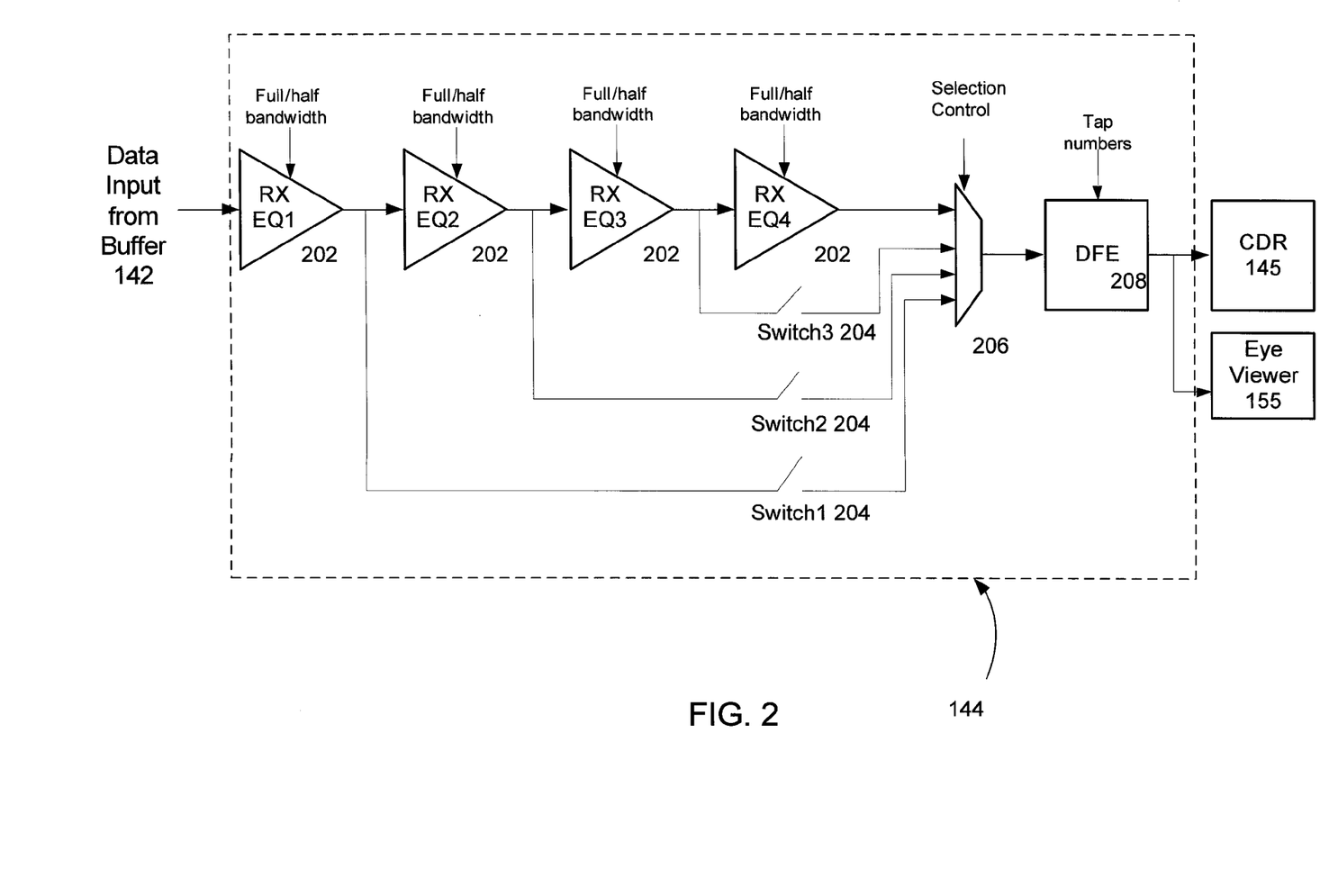
FIG. 2 shows an exemplary receiver equalization circuit in accordance with an embodiment of the invention.

FIG. 2 shows an exemplary receiver equalization (RX EQ) circuit 144 in accordance with an embodiment of the invention. As shown, the RX EQ circuit 144 may include a series of controllable equalization stages 202, bypass switches 204, bypass selector 206, and a controllable decision feedback estimation (DFE) equalizer 208.

The serial data signal from the RX buffer circuit 142 may be received by the series of controllable equalization stages 202. In the exemplary implementation shown, the series includes four controllable equalization stages 202 which are labeled RX EQ1, RX EQ2, RX EQ3, and RX EQ4. In other implementations, the series may include other numbers of controllable equalization stages. Each controllable equalization stage 202 may be implemented as a continuous-time linear estimation (CTLE) equalizer which is controllable to multiple settings (or modes).

Consider one controllable equalization stage 202. In an exemplary implementation, the controllable equalization stage 202 may be set to one of the following settings (or modes): a full-bandwidth setting, a half-bandwidth setting, and a powered-down setting. In the full-bandwidth setting, the controllable equalization stage 202 may be enabled to operate on (filter) its full frequency range. In the half-bandwidth setting, the controllable equalization stage 202 may be enabled to operate on (filter) a portion (for example, approximately half) its full frequency range. In the powered-down setting, the controllable equalization stage 202 may be powered down to conserve power. In the powered-down setting, no equalization is performed on the serial data signal by the controllable equalization stage 202.

In alternate implementations, the controllable equalization stage 202 may have more than three settings. For example, instead of one half-bandwidth setting, the controllable equalization stage 202 may have multiple partial-bandwidth settings. For example, the controllable equalization stage 202 may have a full-bandwidth setting, a three-quarters-bandwidth setting, a half-bandwidth setting, a quarter-bandwidth setting, and a powered-down setting.

The bypass switches 204 may be arranged so as to controllably obtain the serial data signal at nodes between adjacent equalization stages 202 in the series. In the exemplary implementation shown, a first bypass switch (Switch1) 204 receives the output of the first controllable equalization stage (RX EQ1) 202, a second bypass switch (Switch2) 204 receives the output of the second controllable equalization stage (RX EQ2) 202, and a third bypass switch (Switch3) 204 receives the output of the third controllable equalization stage (RX EQ3) 202. If Switch1 204 is closed, then the output of RX EQ1 202 is provided to the multiplexer 206. If Switch2 204 is closed, then the output of RX EQ2 202 is provided to the multiplexer 206. If Switch3 204 is closed, then the output of RX EQ3 202 is provided to the selector 206.

The selector 206 may be controllable to select the output of one of the equalization stages 202 and provide it to the controllable DFE equalizer 208. In particular, as shown in the figure, the selector 206 may receive as inputs the output of each bypass switch (Switch1, Switch2, and Switch3 in the depicted exemplary implementation) 204 and the output of the last controllable equalization stage (RX EQ4 in the depicted exemplary implementation) 202. The selector 206 may be controlled to select one of these inputs to be output to the controllable DFE equalizer 208.

The controllable DFE equalizer 208 is a non-linear equalization circuit which uses feedback relating to the logic state of previously-transmitted data bits in order to decide the logic state of a present data bit. In accordance with an embodiment of the invention, unused taps within the controllable DFE equalizer 208 may be powered down based on input data that indicates the tap numbers to be powered down (or, alternatively, the tap numbers to be powered on). As shown, the controllable DFE equalizer 208 may be arranged to provide its output (the equalized serial data signal) to both the CDR circuit 145 and the eye monitor circuit 155.

Figure 3A:
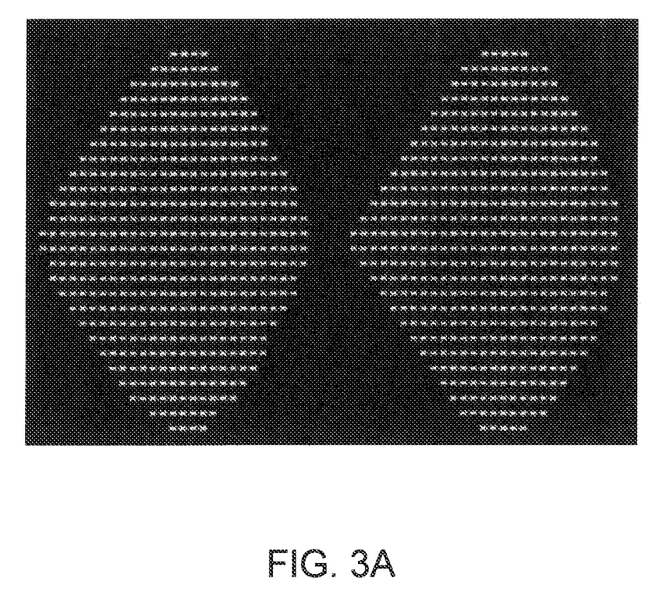
FIGS. 3A and 3B depict example eye opening diagrams in accordance with an embodiment of the invention.
Figure 3B:
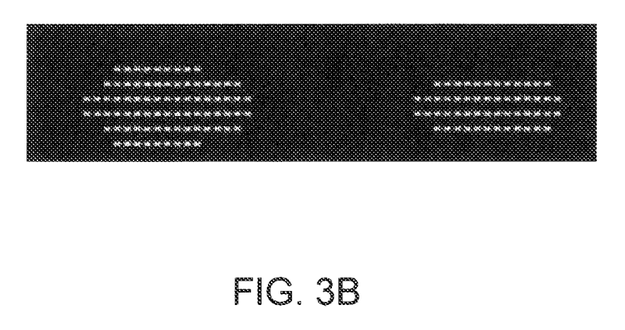

FIGS. 3A and 3B depict example eye opening diagrams in accordance with an embodiment of the invention. Both eye opening diagrams depict data collected from eye monitoring circuitry of a receiver. The horizontal axis indicates phase shift, while the vertical axis indicates a reference voltage level.

The asterisk points indicate points (i.e. phase shift/reference voltage bins) at which the BER is very low or zero such that the points are considered to be part of the eye opening region. The solid area (without asterisk points) indicates points with higher BERs such that the points are considered to be not part of the eye opening region. The size of an eye opening may be measured by a measure of the width and/or height of the eye opening region. Shown in FIG. 3A is a larger open eye, while a smaller open eye is shown in FIG. 3B.

In accordance with an embodiment of the invention, the link operations associated with both the larger open eye in FIG. 3A and the smaller open eye in FIG. 3B may be operating error free from a digital point of view. In other words, the smaller open eye may be sufficient to avoid bit errors during operation.

Conventional receivers generally prefer the larger eye opening, such as shown in FIG. 3A. This is because a link operating with a larger eye opening can withstand analog distortions over time and still recover the correct data bits.

In contrast, in accordance with an embodiment of the invention, the smaller eye opening, such as shown in FIG. 3B, is generally preferred, so long as the BER is zero or very low. This is because a link operating with the smaller eye opening utilizes a fraction of the power compared with a link operating with the larger eye opening. In addition, the cross talk hazard for neighboring lanes is reduced.

Figure 4:
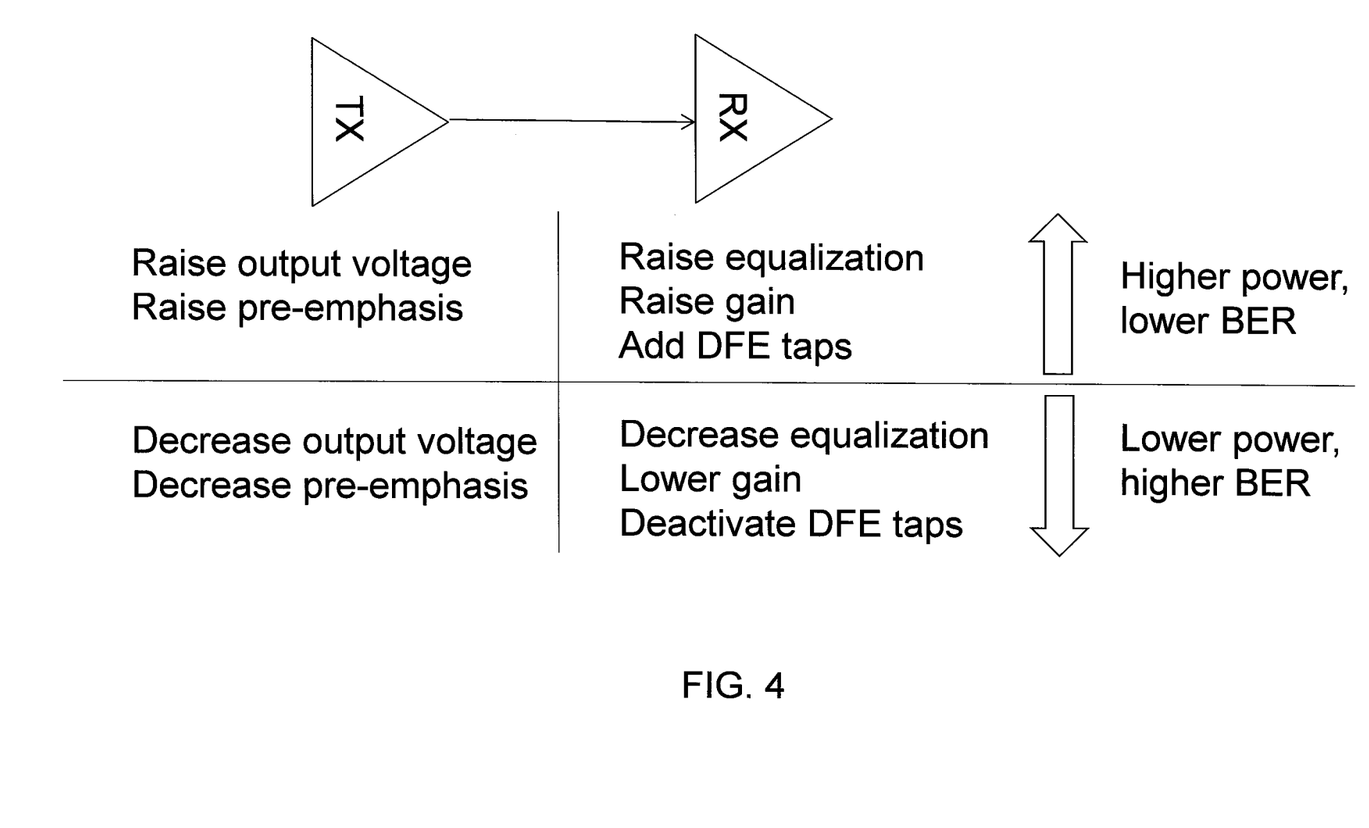
FIG. 4 is a diagram depicting the relationship between power, BER, and transmitter and receiver controls in accordance with an embodiment of the invention.

FIG. 4 is a diagram depicting the relationship between power, BER, and transmitter and receiver controls in accordance with an embodiment of the invention. As depicted on the right side of the diagram, higher power is generally associated with lower BER, and lower power is generally associated with higher BER.

As depicted on the left side of the diagram, to achieve lower BER, analog controls at the transmitter (TX) may be controlled to raise the output voltage of the driver 126 or raise the pre-emphasis applied by the transmitter equalizer 124. On the other hand, to use less power, analog controls at the TX may be controlled to lower the output voltage of the driver 126 or lower the pre-emphasis applied by the transmitter equalizer 124.

As depicted in the middle of the diagram, to achieve lower BER, analog controls at the receiver (RX) may be controlled to raise the equalization applied by the equalization stages 202, raise the gain at the buffer 142, and/or increase the DFE taps being used by the DFE 208. On the other hand, to use less power, analog controls at the RX may be controlled to lower the equalization applied by the equalization stages 202, lower the gain at the buffer 142, and/or decrease the DFE taps being used by the DFE 208

Note that the relationships depicted in FIG. 4 are not absolute. For example, increasing the transmit voltage to an extremely high level will tend to increase (rather than lower) BER. Nevertheless, the relationships depicted in FIG. 4 are expected to generally hold true for a reasonable range of operational settings.

Figure 5:
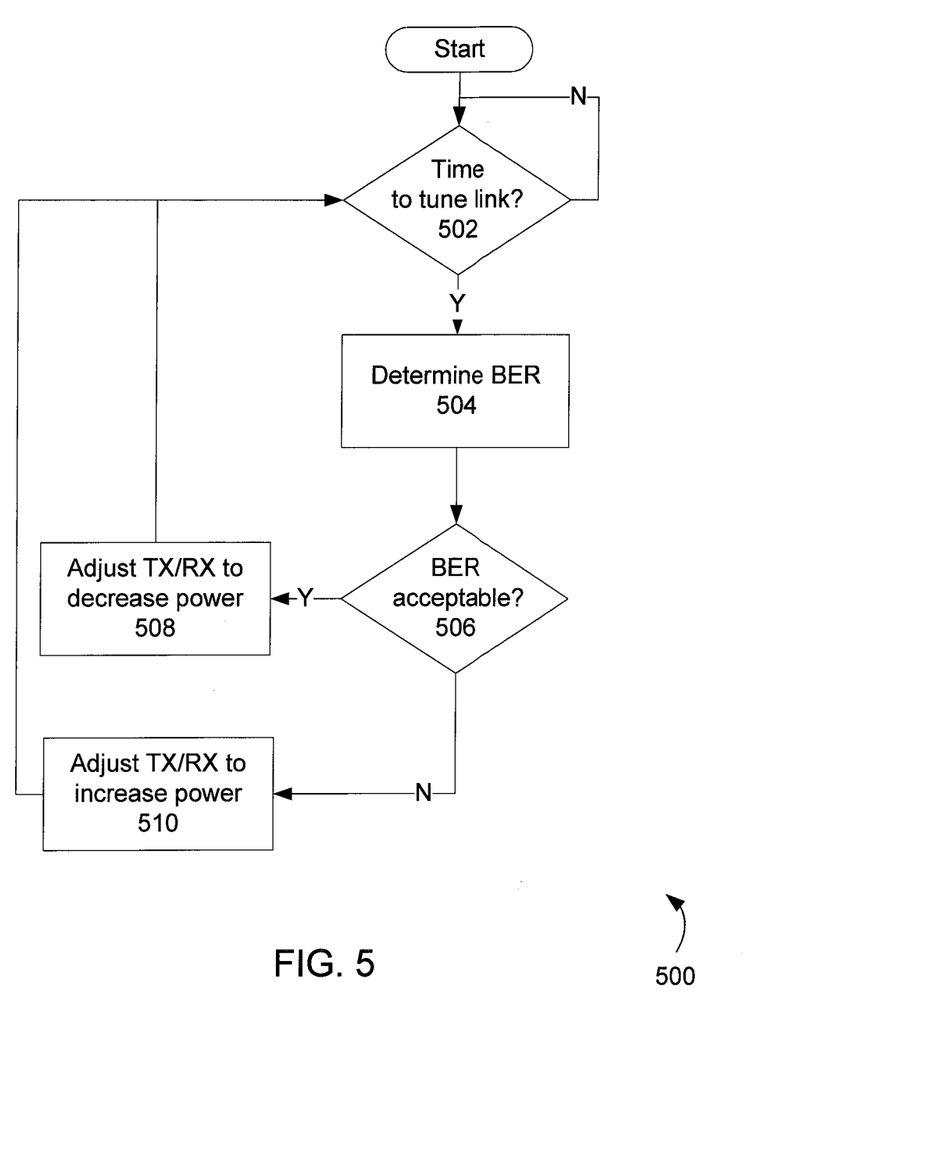
FIG. 5 is a flow chart of an exemplary method of dynamic analog tuning of a link for power conservation in accordance with an embodiment of the invention.

FIG. 5 is a flow chart of an exemplary method 500 of dynamic analog tuning of a link for power conservation in accordance with an embodiment of the invention. In an exemplary implementation, this method 500 may be performed using the circuit structures described above in relation to FIGS. 1 and 2.

At the start of the method 500, per block 502, a determination may be made as to whether it is time to tune the link. This determination may be made by the RX tuning controller 157. In an exemplary implementation, a link may be tuned periodically with adjustments to the TX and/or RX controls to reduce or shift link power while maintaining an acceptably low BER. As a simple example, a link may be tuned once per second.

When it is time to tune the link, then the BER of the link may be determined per block 504. In an exemplary implementation, the BER determination may be made using the eye monitor 155 and may be made over a meaningful amount of time, such as a period of one second, for example. In an alternate implementation, the BER determination may be made by monitoring of the BER rate of the inbound traffic directly. This effectively limits the observation to a region near the center of the eye opening. In another alternate implementation, the BER determination may be made using a secondary receiver in lock to a reference mode which may obtain BER information at other points.

Per block 506, a determination may then be made as to whether the BER so determined is acceptable or not. This determination may be made by the RX tuning controller 157. In an exemplary implementation, the BER may be determined to be acceptable if the BER is at or below a threshold rate. In one specific example, the threshold rate may be zero.

If the BER is determined to be acceptable per block 506, then, per block 508, the transmitter and/or the receiver may be adjusted incrementally to decrease the power used. The method 500 may then loop back to block 502 and wait until it is again time to tune (adjust) the link.

On the other hand, if the BER is determined to be unacceptable per block 506, then, per block 510, the transmitter and/or the receiver may be adjusted incrementally to increase the power used. The method 500 may then loop back to block 502 and wait until it is again time to tune (adjust) the link.

Note that, in one embodiment, the method 500 described above of dynamic analog tuning may be applied to conserve power on a lane-by-lane basis for a multi-lane link. In an alternate embodiment, the method 500 may be applied to conserve an overall power for all lanes of a multi-lane link. In this case, for example, cross-talk between lanes may be minimized to a point that DFE is not required.

Figure 6:
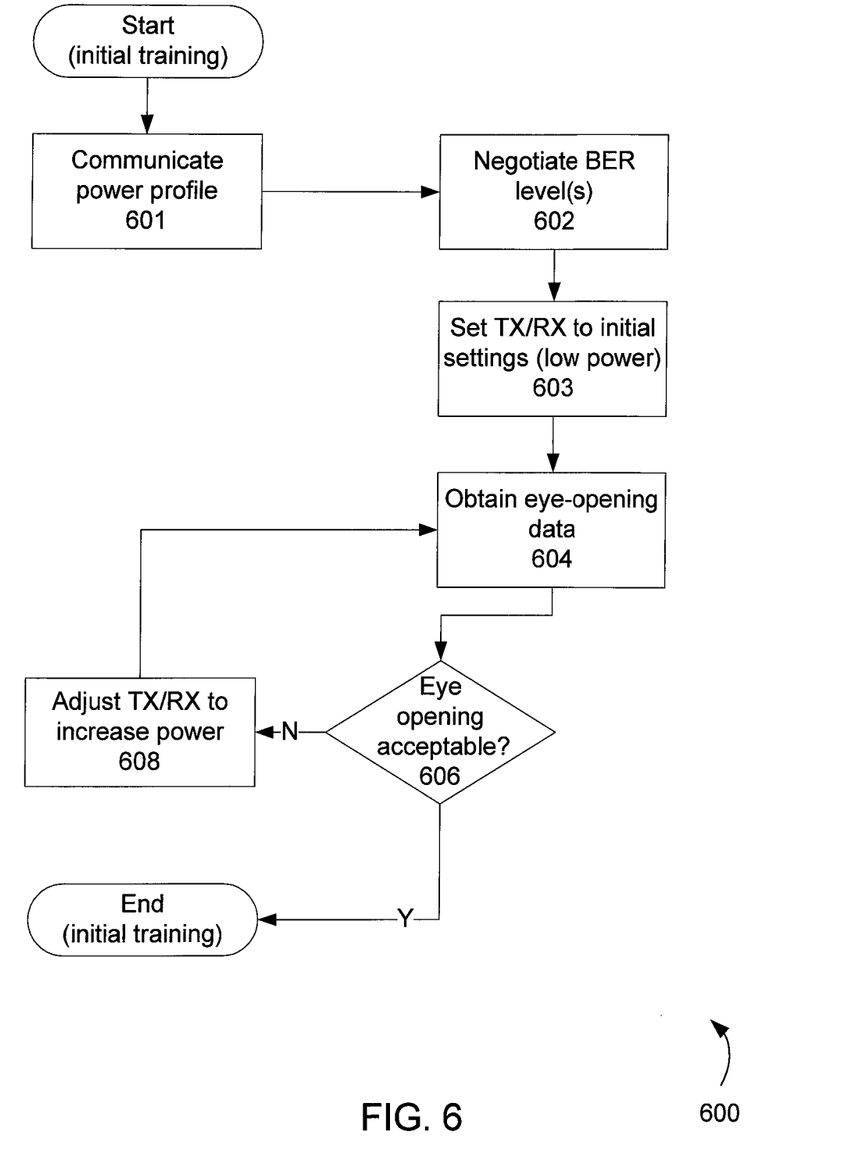
FIG. 6 is a flow chart of an exemplary method of initially training a link in accordance with an embodiment of the invention.

FIG. 6 is a flow chart of an exemplary method 600 of initially training a link in accordance with an embodiment of the invention. This method 600 may be performed when the communication link is initialized.

Per block 601, the tuning controller at the remote side of the link may transmit its expected power profile for the requested setup to the tuning controller at the local side of the link. The expected power profile from the remote side provides the local tuning controller with the information to optimize the control parameters to minimize a total power or shift (trade) power used between the two sides. In an exemplary embodiment, the local side is the receiver, and the remote side is the transmitter. In an alternate embodiment, the local side may be the transmitter, and the remote side may be the receiver.

Per block 602, one or more BER levels may be negotiated between the receiver and the transmitter. In an exemplary implementation, the BER levels (thresholds) may include a lower-power marginal BER level and a higher-power normal BER level. The marginal BER level is a higher bit error rate than the normal BER level.

In accordance with an embodiment of the invention, the normal BER level may be used as an acceptable BER threshold in block 506 of FIG. 5 during normal operation. However, during a prolonged period when idles are being sent over the link, the BER threshold may be switched from the normal BER level to the marginal BER level. This advantageously saves power during the prolonged idle period. When the traffic is no longer idle, then the BER threshold may be switched back from the marginal BER level to the normal BER level. The switching between these two modes of operation may be implemented using in-band or side-band communications between the transmitter and the receiver.

Per block 603, the transmitter and the receiver may be set to initial settings. In accordance with an embodiment of the invention, these initial settings may be the lowest power settings, or power settings that are sufficiently low so that the expected power used is less than needed to obtain an acceptable eye opening.

Per block 604, eye-opening data may be obtained. The eye-opening data may be obtained using eye monitoring circuitry at the receiver. The eye-opening data may include a measure of the eye opening, such as the width, height, or area of the eye opening.

Per block 606, a determination may be made as to whether the eye opening is acceptable (i.e. acceptably large). In one implementation, this determination may be made by comparing the measure of the eye opening against an associated threshold. If the measure is greater than the threshold, then the eye opening may be considered to be acceptable.

If the eye opening is not yet acceptable, then, per block 608, the transmitter and/or the receiver may be adjusted incrementally to increase the power used. The method 600 may then loop back to block 604 and obtain eye-opening data using the new settings.

The method 600 continues until the eye opening is determined to be acceptable in block 606. Once the eye opening is determined to be acceptable, then the initial training may be considered to be done.

Example Power/Performance Trade-Off Information

In accordance with an embodiment of the invention, the incremental adjustments to decrease power (per block 508) and to increase power (per block 510 or block 608) may be made based on power/performance trade-off data for the TX 120 and the RX 140. The power/performance trade-off data may be based on one or more of the following: a) predetermined knowledge about the receiver and transmitter device capabilities; b) power/performance data from historical adjustments for this specific link; and c) monitoring of operating conditions (such as current or temperature). The power/performance trade-off data may indicate which operating parameters are the most power-efficient (least power-hungry) in terms of boosting link performance and which operating parameters are the least power-efficient (most power-hungry) in terms of boosting line performance.

For instance, consider the following simple example with following power/performance trade-off information: i) the first most power-efficient (first least power-hungry) way to boost performance involves increasing the gain at the receiver up to a certain amount of gain; ii) the second most power-efficient (second least power-hungry) way to boost performance involves increasing the VOD at the transmitter up to a certain VOD; iii) the third most power-efficient (third least power-hungry) way to boost performance involves raising the equalizations applied by the equalization stages in the receiver; iv) the fourth most power-efficient (fourth least power-hungry) way to boost performance involves raising the pre-emphasis applied by transmitter equalizer; and v) the least power-efficient (most power-hungry) way to boost performance involves increasing the DFE taps being used.

With the above power/performance trade-off information, an incremental adjustment to reduce power may: first, decrease the DFE taps being used at the receiver; second, reduce the transmitter pre-emphasis; third, reduce the equalizations applied by the receiver equalization stages; fourth, decreasing the transmitter VOD; and, fifth, decreasing the receiver gain. In an opposite manner, an incremental adjustment to increase performance (while conserving power) may: first, increase receiver gain; second increase transmitter VOD; third, increase the equalizations applied by the receiver equalization stages; fourth, increase the transmitter pre-emphasis; and, fifth, increase the DFE taps being used at the receiver.

The simple example above has simplified power/performance trade-off relationships for ease of explanation. It is anticipated that power/performance trade-off relationships between the different controls may be more complex. For instance, turning on (using) DFE tap 1 may use more power than powering an equalization stage to a half-bandwidth mode, but less power than upgrading the equalization stage to full-bandwidth mode.

Exemplary FPGA and System

Figure 7:
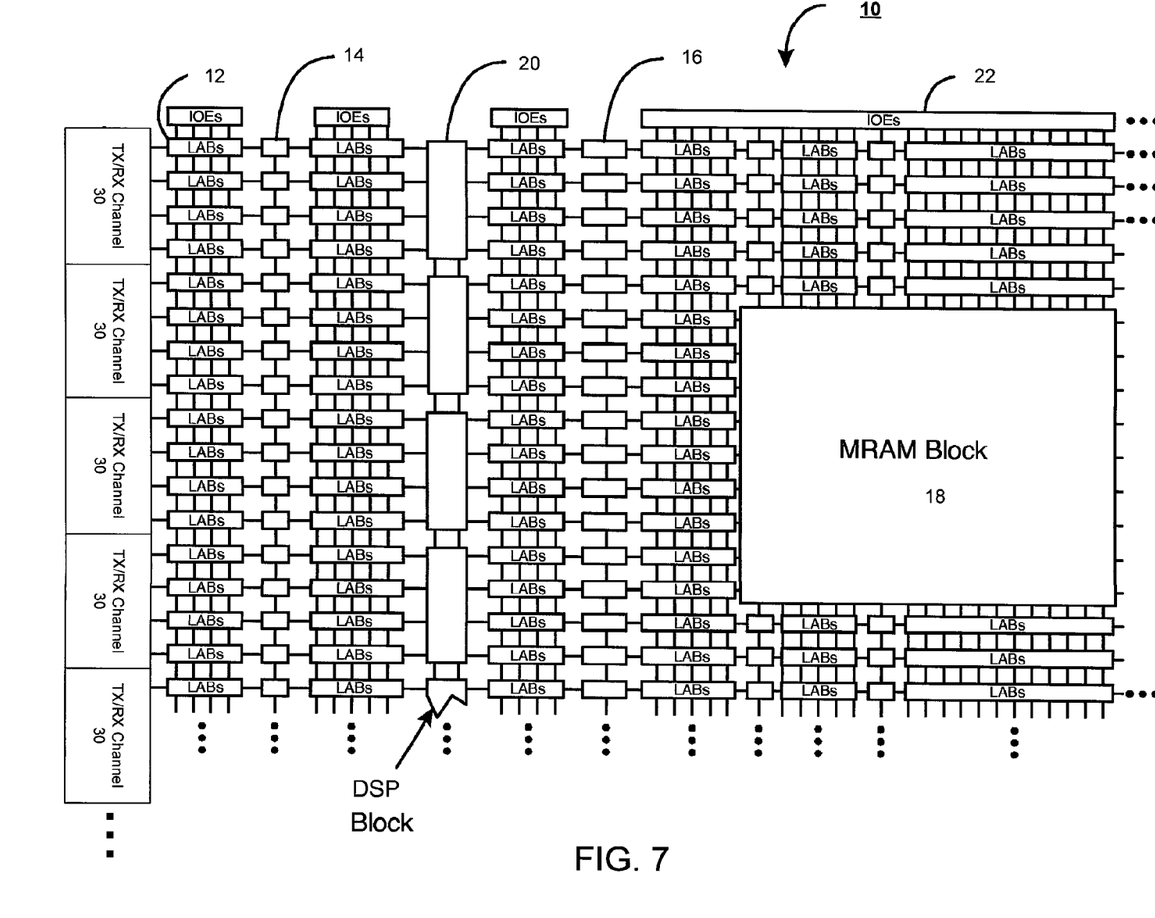
FIG. 7 is a simplified partial block diagram of an exemplary field programmable gate array (FPGA) that may be configured to employ structures and use techniques disclosed herein.

FIG. 7 is a simplified partial block diagram of an exemplary field programmable gate array (FPGA) 10 that may be configured to employ structures and use techniques disclosed herein. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, transmitter and/or receiver circuitry as described herein.

It is to be understood that FPGA 10 is described herein for illustrative purposes only and that the present invention can be implemented in many different types of PLDs, FPGAs, and ASICs.

Figure 8:
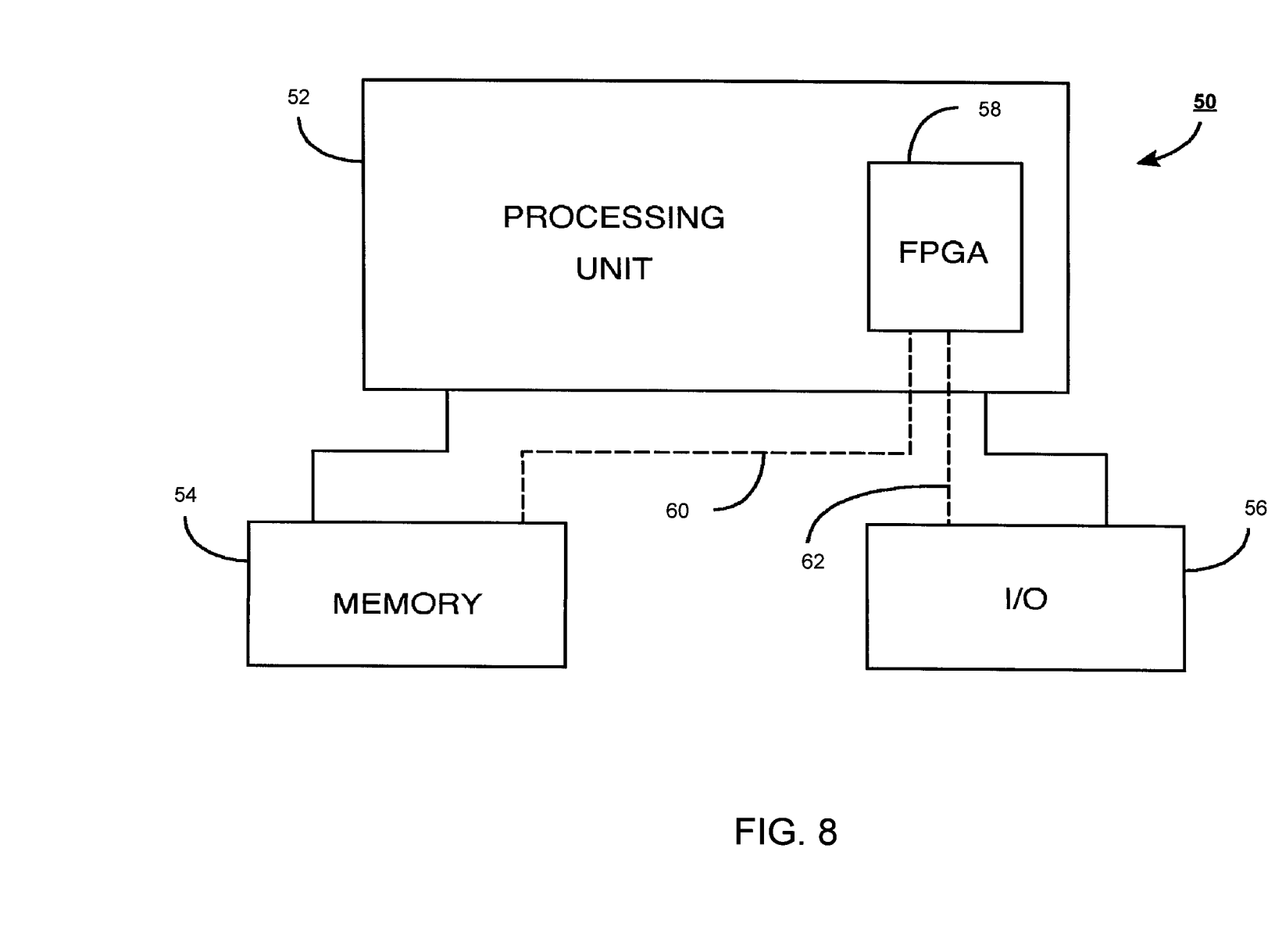
FIG. 8 shows a block diagram of an exemplary digital system that may include an FPGA.

FIG. 8 shows a block diagram of an exemplary digital system 50 that may include an FPGA. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

Conclusion

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for tuning a communication link from a transmitter to a receiver, the method comprising:
    waiting until a time to tune the communication link so as to adjust power used during operation of the communication link;
    determining a bit error rate for the communication link at the receiver;
    comparing the bit error rate against a threshold rate;
    adjusting control parameters for an analog circuitry of the communication link for the receiver and communicating control parameter adjustments to the transmitter to decrease power used when the bit error rate is below the threshold rate; and
    adjusting the control parameters for the analog circuitry of the communication link for the receiver and communicating the control parameter adjustments to the transmitter to increase power used when the bit error rate is above the threshold rate, wherein the transmitter transmits a serial data signal and includes
    a driver to drive the serial data signal onto a communication channel,
    a transmitter equalizer to apply pre-emphasis to the serial data signal, and
    a transmitter tuning controller which adjusts a differential output voltage of the driver and the pre-emphasis applied by the transmitter equalizer, and wherein the receiver receives the serial data signal and includes
    a receiver buffer which receives the serial data signal from the communication channel,
    a receiver equalization circuitry which equalizes the serial data signal,
    a circuit which processes the serial data signal to generate bit error data, and
    a receiver tuning controller which controls a gain of the receiver buffer, which adjusts equalizations applied by the receiver equalization circuitry based on the bit error data and which communicates adjustments to be made by the transmitter to the transmitter tuning controller.

2. The method of claim 1, wherein the time to tune the communication link is periodic.

3. The method of claim 1, wherein the control parameters for the analog circuitry of the communication link are adjusted to decrease power in an order that is based on power/performance trade-off data for the receiver and the transmitter.

4. The method of claim 3, wherein the control parameters for the analog circuitry of the communication link are adjusted to increase power in an opposite order that is based on the power/performance trade-off data for the receiver and the transmitter.

5. The method of claim 1, wherein the control parameters for the analog circuitry of the communication link include a number of taps being used by a decision feedback equalizer at the receiver.

6. The method of claim 5, wherein the control parameters further include a pre-emphasis applied at the transmitter.

7. The method of claim 6, wherein the control parameters further include equalizations applied by a plurality of equalization stages at the receiver.

8. The method of claim 7, wherein the control parameters further include a differential output voltage of a driver at the transmitter.

9. The method of claim 8, wherein the control parameters further include a gain at the receiver.

10. The method of claim 1, further comprising performance of an initial training for the communication link before said waiting, said comparing and said adjusting, wherein the initial training comprises:
setting the control parameters for the analog circuitry of the communication link to initial settings;
obtaining eye-opening data for the communication link using an eye monitoring circuit;
determining whether an eye opening is acceptably large based on the eye-opening data; and
adjusting the control parameters for the analog circuitry of the communication link to increase power used if the eye opening is not acceptably large.

11. The method of claim 10, wherein the initial training ends when the eye opening is determined to be acceptably large.

12. The method of claim 11, wherein the eye opening is determined to be acceptably large when a dimension of the eye opening is larger than a threshold dimension.

13. A system for conserving power used to communicate a serial data signal, the system comprising:
a transmitter which transmits the serial data signal, the transmitter including
a driver to drive the serial data signal onto a communication channel,
a transmitter equalizer to apply pre-emphasis to the serial data signal, and
a transmitter tuning controller which adjusts a differential output voltage of the driver and the pre-emphasis applied by the transmitter equalizer; and
a receiver which receives the serial data signal, the receiver including
a receiver buffer which receives the serial data signal from the communication channel,
a receiver equalization circuitry which equalizes the serial data signal,
a circuit which processes the serial data signal to generate bit error data, and
a receiver tuning controller which controls a gain of the receiver buffer, which adjusts equalizations applied by the receiver equalization circuitry based on the bit error data and which communicates adjustments to be made by the transmitter to the transmitter tuning controller,
wherein the receiver tuning controller determines a bit error rate from the bit error data, compares the bit error rate against a threshold rate, determines control parameter adjustments for the receiver and the transmitter to decrease power used when the bit error rate is below the threshold rate, and determines control parameter adjustments for the receiver and the transmitter to increase power used when the bit error rate is above the threshold rate.

14. The system of claim 13, wherein adjustments are made by the receiver and transmitter tuning controllers in an order that is based on power/performance trade-off data for the receiver and the transmitter.

15. The system of claim 13, wherein the control parameter adjustments include an adjustment to a number of taps being used by a decision feedback equalizer at the receiver equalization circuitry.

16. The system of claim 13, wherein the control parameter adjustments include an adjustment to the pre-emphasis applied by the transmitter equalizer.

17. The system of claim 13, wherein the control parameter adjustments include an adjustment to equalizations applied by a plurality of equalization stages at the receiver circuit.

18. The system of claim 13, wherein the control parameter adjustments include an adjustment to the differential output voltage of the driver.

19. The system of claim 13, wherein the control parameter adjustments include an adjustment to a gain at the receiver circuit.

* * * * *